Sept. 22, 1964  W. V. BROWN, JR  3,149,739
AUXILIARY LOADING CONTAINER FOR VEHICLES
Filed May 3, 1962  7 Sheets-Sheet 1
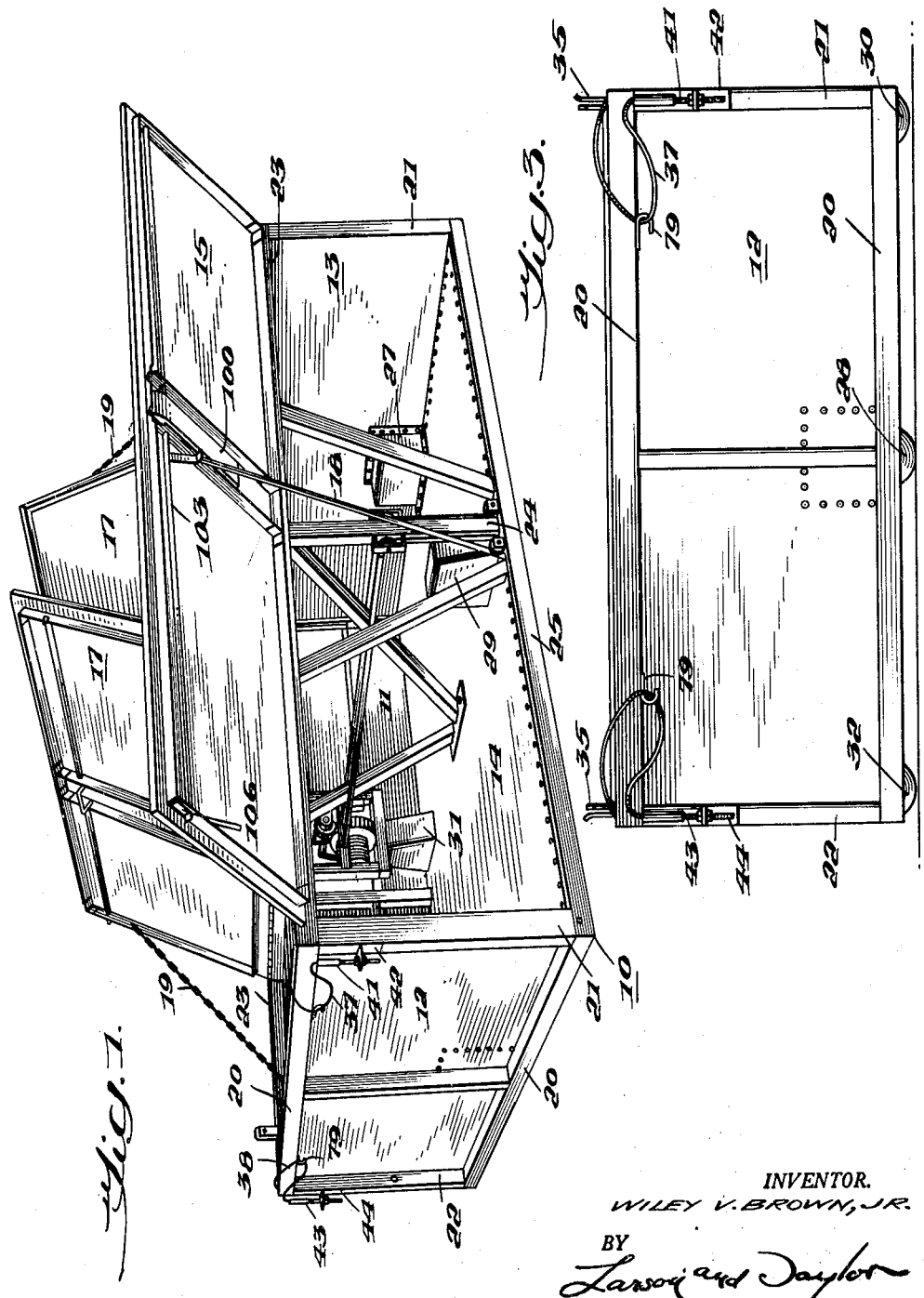
INVENTOR.
WILEY V. BROWN, JR.
BY
*Larson and Taylor*
ATTORNEYS Sept. 22, 1964 W. V. BROWN, JR 3,149,739
AUXILIARY LOADING CONTAINER FOR VEHICLES
Filed May 3, 1962 7 Sheets-Sheet 2
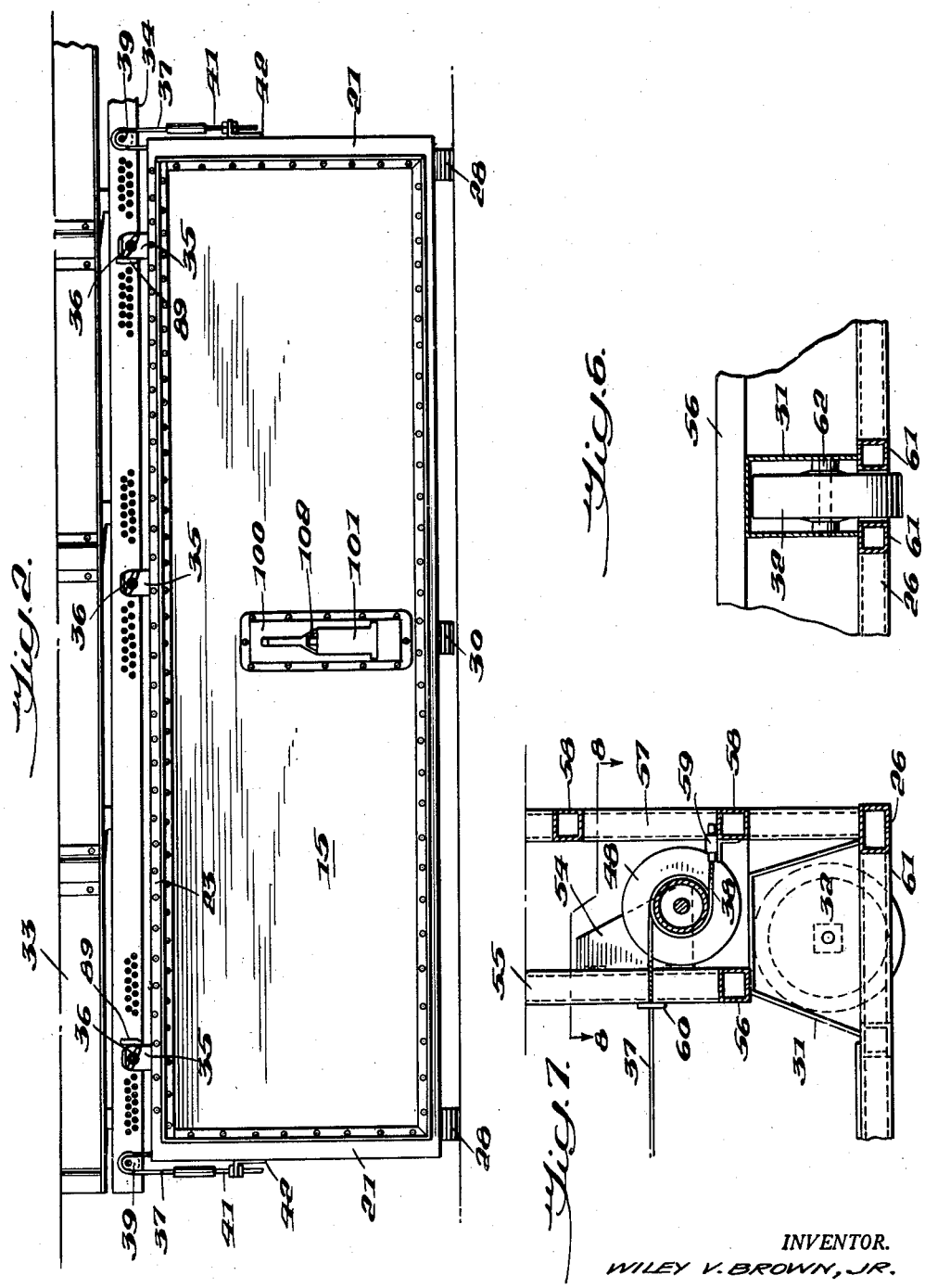
INVENTOR.
WILEY V. BROWN, JR.
BY
Larson and Taylor
ATTORNEYS Sept. 22, 1964 W. V. BROWN, JR 3,149,739
AUXILIARY LOADING CONTAINER FOR VEHICLES
Filed May 3, 1962 7 Sheets-Sheet 3
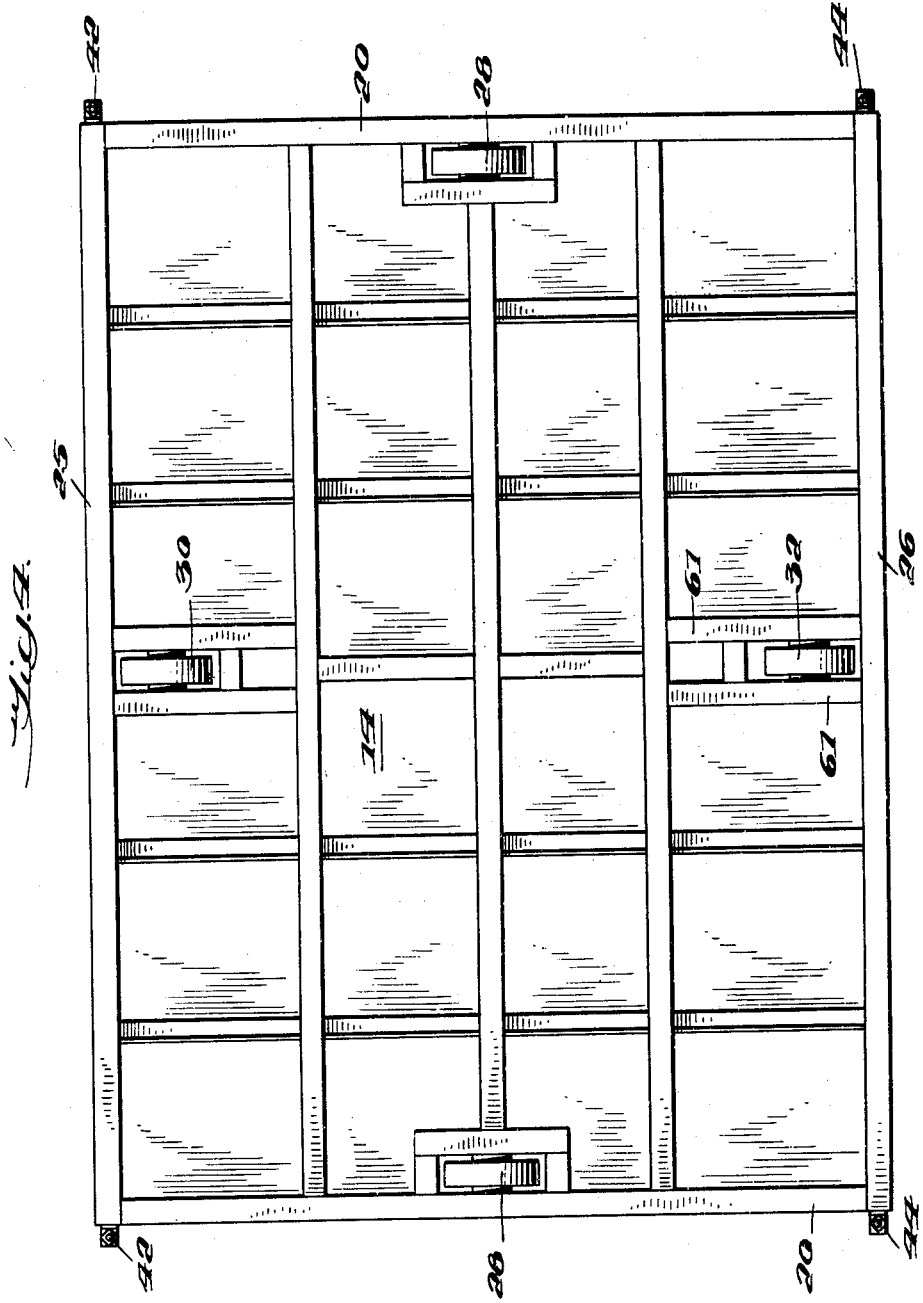
INVENTOR.
WILEY V. BROWN, JR.
BY
Larson and Taylor
ATTORNEYS

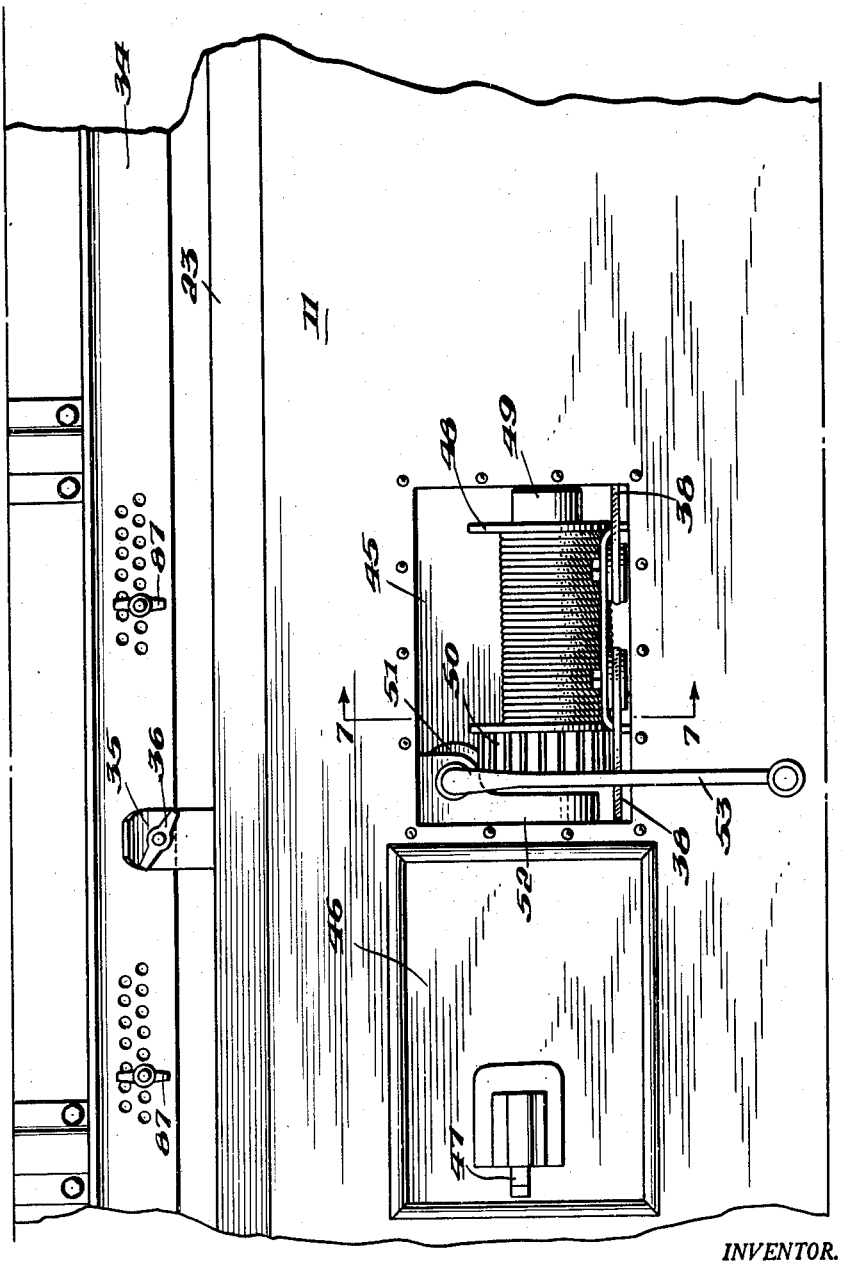

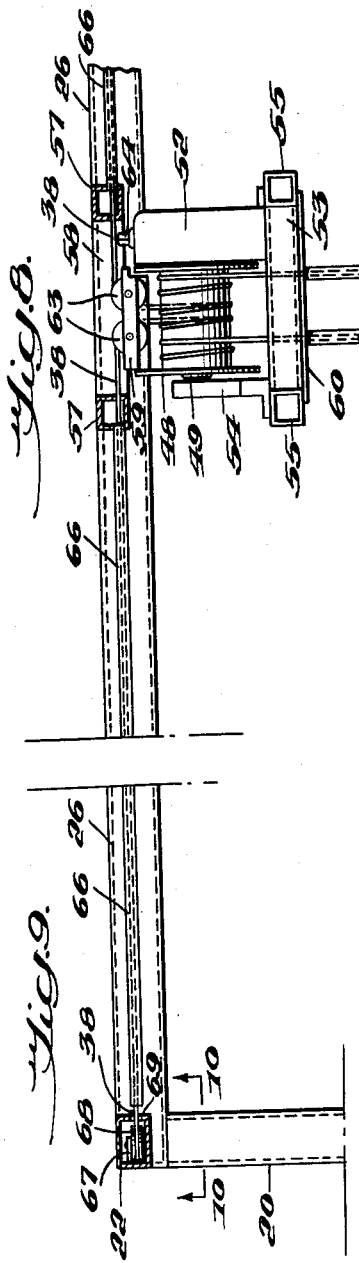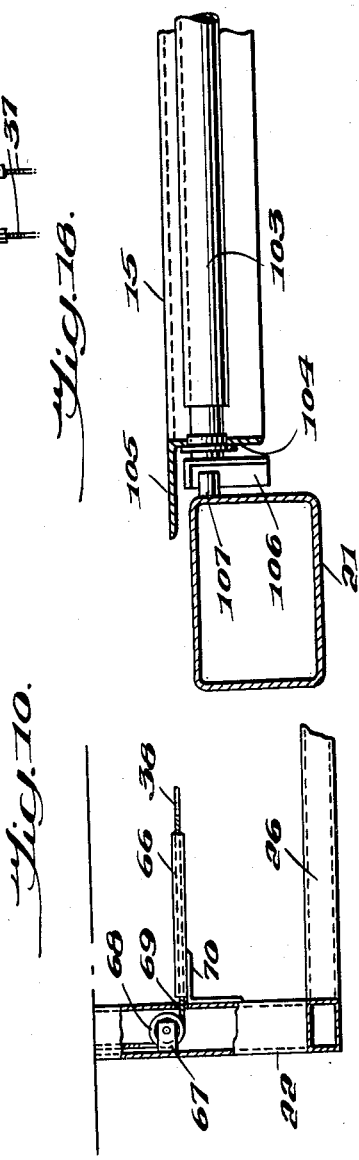

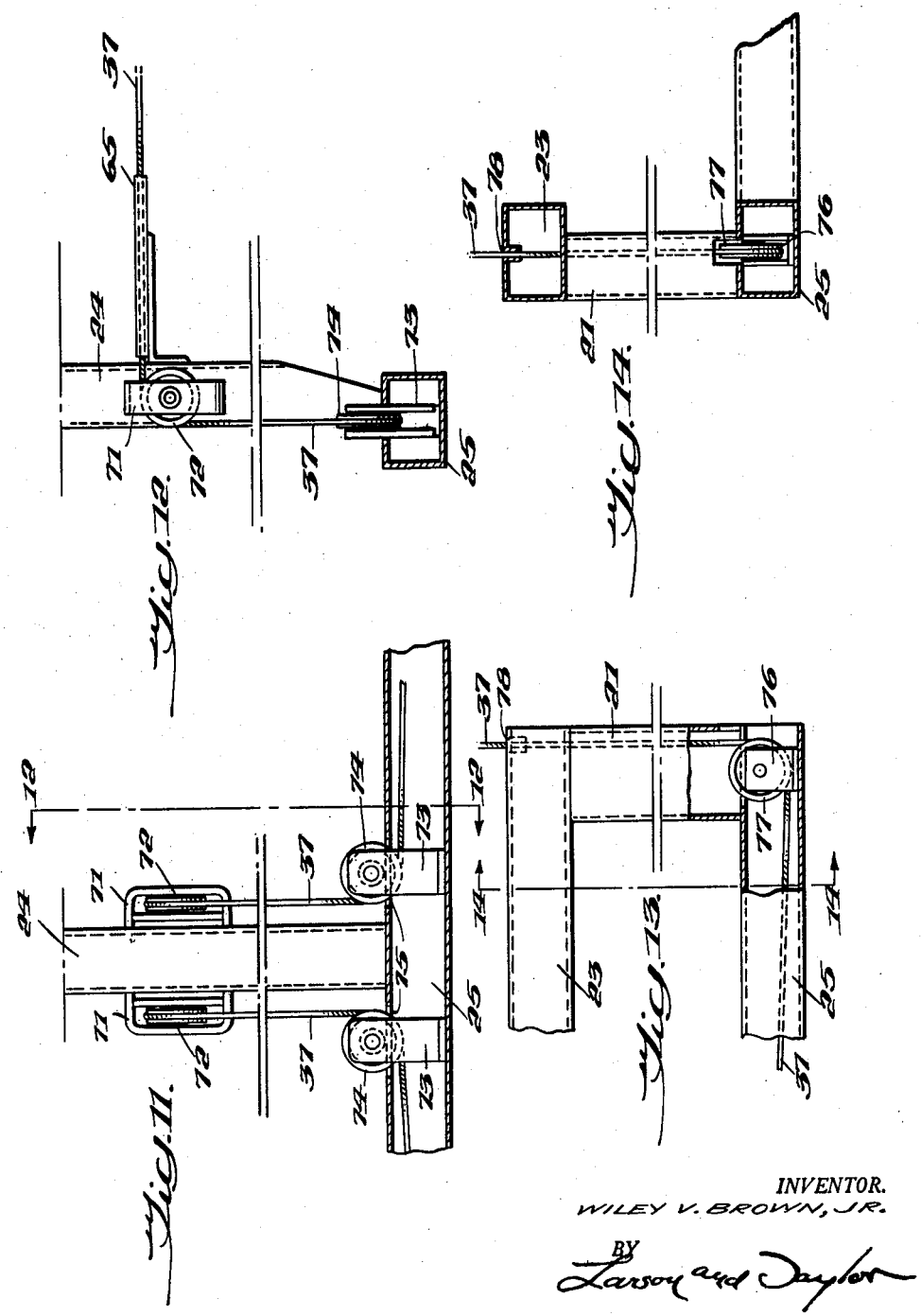

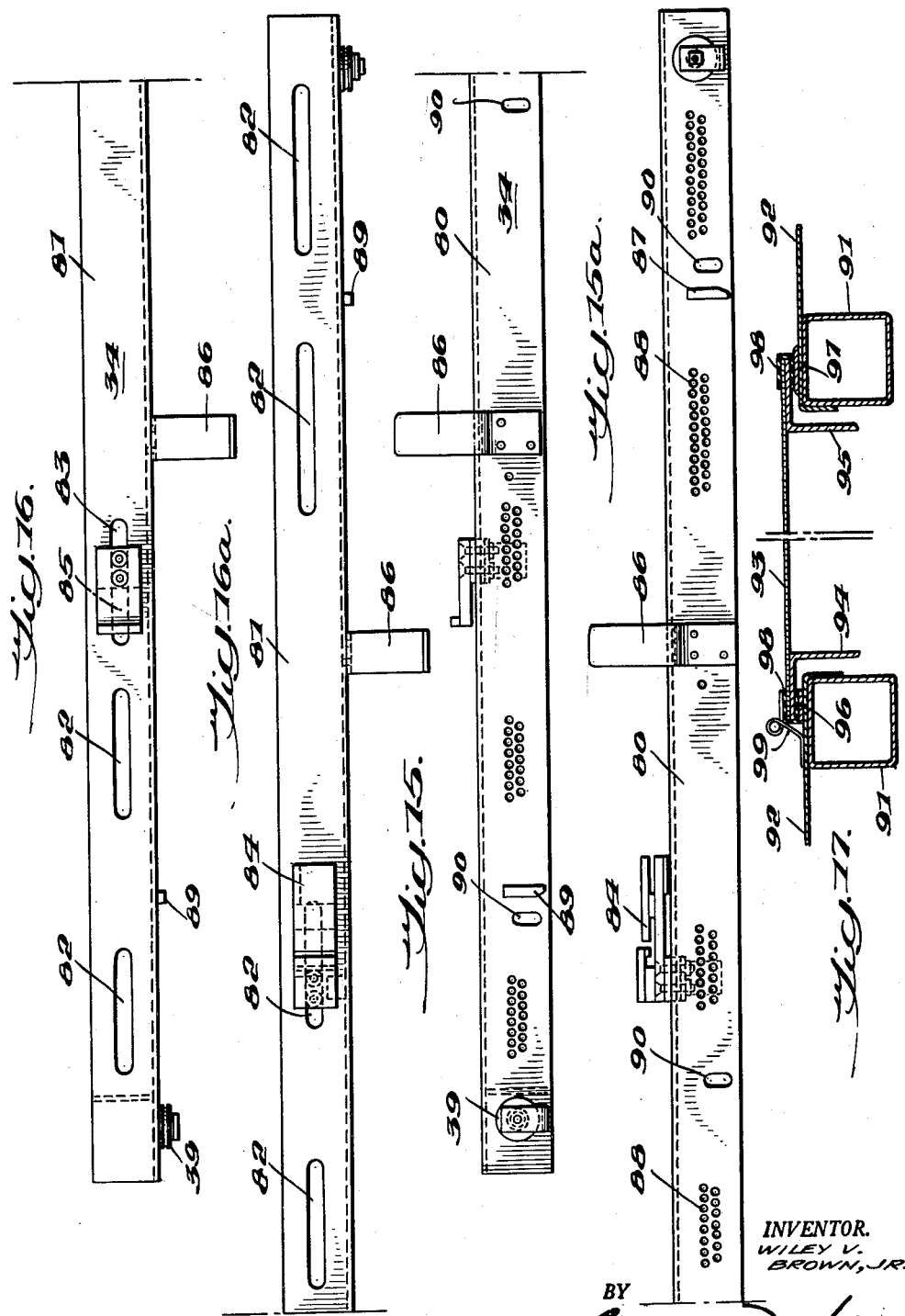

United States Patent Office 3,149,739
Patented Sept. 22, 1964

3,149,739
AUXILIARY LOADING CONTAINER
FOR VEHICLES
Wiley V. Brown, Jr., 4313 Clyde Drive,
Jacksonville, Fla.
Filed May 3, 1962, Ser. No. 192,160
20 Claims. (Cl. 214—517)

This invention relates to a load carrying apparatus, and more particularly to an auxiliary loading container for increasing the load capacity of a vehicle without any substantial modification of the supporting vehicle.

Transporting vehicles such as trucks have been subject to regulations restricting the size and load to avoid any undue damage to highway systems. However goods to be transported usually have sufficient bulk such that the given vehicle is dimensionally loaded before its weight capacity has been reached. For this reason, attempts have been made to increase the volume capacity of such vehicles.

Heretofore, solutions for increasing the load size of a vehicle when transporting large bulk goods have required extensive modifications of the vehicles and have either adversely affected the center of gravity of the vehicle, exposed the goods to road conditions, or made the excess loading difficult. Many of the known solutions have more than one of these and other disadvantages.

The present invention, however, eliminates these and other disadvantages encountered when attempting to increase the size and volume capacity of a transporting vehicle.

An important object of the invention is, therefore, to provide an improved auxiliary container for transportation vehicles.

Another object is the provision of an auxiliary container for use with a vehicle requiring little or no modification of the vehicle.

Yet another object is in the provision of novel elevating and attaching means for the container.

And another object is to provide a container capable of simple handling and maneuverability.

Still another object is in the provision of a simple, easily manufactured, and high capacity auxiliary container for use with transporting vehicles.

And still another object resides in the provision of an auxiliary container of stability and construction capable of adequately protecting the goods from injury due to transportation conditions.

These and other objects and advantages will become more apparent and be better understood from the following detailed description of the preferred embodiment of the invention, of which the accompanying drawing forms a part thereof, and wherein:

FIG. 1 is a persepective view of a container in the preferred embodiment of the invention with the doors open, FIG. 2 is a front view of the container and vehicle adapter as attached to a truck trailer, FIG. 3 is a side view of the container, FIG. 4 is a bottom view thereof, FIG. 5 is a partial rear view showing the winch mechanism and adapter, FIG. 6 is a sectional detail of the rear wheel and wheel housing, FIG. 7 is a section of the winch drum and rear wheel assembly, taken on 7—7 of FIG. 5, FIG. 8 is a sectional view showing the winch assembly and taken on 8—8 of FIG. 7, FIG. 9 is a detail plan view of a rear corner rib and cable assembly, FIG. 10 is a section taken on line 10—10 of FIG. 9, FIG. 11 is a broken detail front elevation of the center front and bottom front longitudinal ribs and associated cable assembly, FIG. 12 is a section taken on 12—12 of FIG. 11, FIG. 13 is a broken detail elevation of a front corner rib and associated cable assembly, FIG. 14 is a section taken on 14—14 of FIG. 13, FIG. 15-15a is a side view of an adapter assembly, FIG. 16-16a is a top view thereof, FIG. 17 is a typical wall and door assembly, and FIG. 18 is a typical door catch.

As shown in the drawings, the preferred embodiment of the present invention comprises a container body having a frame 10, a back wall 11, side walls 12 and 13, bottom wall 14, front door 15, and top wall and doors 17, 17. Front door 15 may be hinged along its top edge to the frame 10 and supported in its open position by a suitable support rod, as at 18. The top doors 17 are hinged along their inner, transverse edges and are pivotable beyond the perpendicular to the top wall (not shown). They may be held in this position by suitable chains 19.

Frame 10 comprises transverse end ribs 20, vertical front corner ribs 21, vertical rear corner ribs 22, top longitudinal ribs 23, vertical center front rib 24, bottom front longitudinal rib 25, bottom rear longitudinal rib 26, and additional structural ribs as are hereinafter described or as may be necessary. The ribs are preferably hollow for both structural strength and adaptation to the novel elevating means.

Located adjacent the bottom wall 14 and side walls 12 and 13, respectively, are side wheel housings 27 and wheels 28. A front wheel housing 29 with wheel 30 and rear wheel housing 31 with wheel 32 are also positioned as shown. The particular construction of the wheel housings and wheels will be described hereinafter. Sheet material is attached to the ribs to form the walls and doors, thereby sealing the interior from road exposure. Suitable seams with refrigerator gasketing are also used.

FIG. 2 discloses the container as attached to the vehicle body. In particular 33 represents a partial side view of a trailer truck body. By suitable trailer rib engaging means to be described hereinafter, two adapters 34 are positioned underneath the trailer body, one on either side of the body. After the container has been raised into position according to the invention, double flange members 35 engage the adapter 34, and ball lock release pins 36 are inserted through corresponding holes in the flange members 35 and adapters 34 to rigidly support the container during transportation. Pulleys 39, 40 are rotatably fixed to the adapters 34, near their ends.

The novel elevating means as shown comprises two sets of cables 37 and 38, each of which are attached by one end to a respective corner vertical rib member 21 or 22. Each cable 37 is fixed to a bolt converter 41, which in turn is adjustably attached by two nuts to flange member 42 fixed to rib 21. Correspondingly, each cable 38 is fixed to a bolt converter 43, which is adjustably attached to flange member 44 fixed to rib 22.

Pulleys 39 are adapted to engage cables 37, and correspondingly, pulleys 40 adapted to engage cables 38.

Rear wall 11 contains an opening 45 for access to the elevating control mechanism. Door 46 and latch 47 are provided for protecting the elevating mechanism from weather and road conditions.

Within the access opening is a rotatable winch drum 48 on axle 49 which in turn is supported by plates 52 and 54. Spur gear 50 is rigidly fixed to one end of drum 48. Cooperating with spur gear 50 is a worm gear 51 having its axis transverse to the axis of the spur gear 50. Worm gear 51 is rotatably attached to support plate 52 by its axle 64. (Shown in FIG. 8.) Axle 64 is adapted at its exposed end to receive a rotary motion actuator. In the particular embodiment shown, this comprises a hand crank 53 having a square opening for inserting the exposed square end of axle 64 therein. Any known brake means, such as a cooperating pin and slot may be used to hold the elevating mechanism from rotation at any setting. It should of course be noted that the worm gear itself embodies the feature of holding the mechanism from rotation except through any positive cranking in either direction.

Support plates 52 and 54 are fixed to a rectangular frame formed by vertical ribs 55 and horizontal ribs 56. Upper rib 56 is structurally fixed at each end, not shown, to horizontal transverse ribs parallel to transverse end ribs 20 which are in turn fixed to longitudinal ribs 23 at their respective ends. Lower rib 56 may suitably rest on rear wheel housing 31.

Co-extensive with access opening 45 and adjacent back wall 11 is a support frame formed by two vertical ribs 57 joined to the structural longitudinal ribs 26 and 23, and two horizontal ribs 58 fixed at their respective ends to the vertical ribs 57.

Since elevating or lowering are to be simultaneous on all cables, it is of course necessary that they all are wound in the same direction of rotation about the winch drum 48. As viewed in FIG. 7, the chosen direction is clockwise, although the alternate direction is also available. Thus, each cable 38 extends directionally away from below, and each cable 37 extends from above, the drum 48.

For more uniform loading capabilities, the entire elevating mechanism is made symmetrical relative to a transverse vertical plane passing through the center front rib 24, thereby making the right half structurally equal to the left half. Therefore, for description purposes, it would be sufficient to describe and illustrate only one side for cable 37, and similarly, only one side for cable 38.

With reference now to FIGS. 8–10, mounted on horizontal rib 58 is a bracket 59 supporting a rotatable pulley 63. Cable 38 extends around the pulley 63, through openings in vertical rib 57 and through a hollow conduit 66 extending from rib 57 to corner rib 22. Conduit 66 primarily protects the cable and is fixed to rib 57 and to an angle 70 in turn fixed to corner rib 22. Cable 22 then passes through an opening 69 in rib 22 and around rotatable pulley 68, which is fixed to rib 22 by the pulley support 67. Cable 22 thence passes up the rib 22 and through an opening at the top, where it is in turn secured to the frame 10 by the bolt converter 43 and flange member 44.

Referring now to FIGS. 11–14, from the drum 48, cable 37 passes through an opening in plate 60, which is attached to vertical ribs 55, and then through the hollow conduits 65. Conduit 65, again primarily used for protection, is fixed to plate 60 and center front rib 24.

Emerging from the conduit 65, cable 37 then passes around rotatable pulley 72 which is fixed to the rib 24 by means of the pulley frame 71. Below this is a pulley 74 mounted partially within longitudinal rib 25 by means of support 73. In this manner, cable 37 passes around pulley 74 by passing through opening 75 and into the longitudinal rib 25. The cable 37 then is led to a vertical corner rib 21 and passes vertically upward therethrough by means of the pulley 77 and pulley support 76. It then emerges from the top of the frame 10 through the opening 78, and is attached to the bolt converter 41. Hooks 79 are provided so that the cables may be properly secured when not in use.

A typical wheel and wheel housing is shown by FIG. 6. Here, rear wheel housing 31 is mounted on wheel ribs 61. Fixed therebetween is a suitable shaft 62 on which wheel 32 is rotatably mounted. As can be seen from FIGS. 2 and 3, side wheels 28 are mounted on an axis slightly lower than that on which front wheel 30 and rear wheel 32 are mounted. In this manner the container is quite easily maneuvered and turned, since at any given instance, only three wheels are supporting it.

FIGS. 15–16 depict one of two adapters used in the preferred embodiment of the invention. The adapter 34 comprises an elongated angle iron having a vertical side 80 and an upper horizontal side 81. Horizontal side 81 has therein a series of slots 82 in which attaching members 84 (one shown) are slidably mounted. Attaching members 84 are made of short plates welded together in the manner as shown. A shorter plate is mounted below horizontal side 81 and releasably attached to the member 84 by means of the bolts shown. This permits change of member 84 in the event of damage to either member 84 or adapter 34. This shorter plate includes a vertical section slidable against vertical side 80.

An additional slot 83 has mounted therein an anchoring member 85. Member 85 is constructed as shown, and is slidably mounted in the slot 83 in a manner similar to the attaching members 84.

Adapter 34 is mounted below the vehicle frame by positioning each attaching member 84 such that a structural part of the vehicle, for example, an I-beam, is inserted into the appropriate slots within member 84 or between member 84 and side 81. The attaching members may, of course, be fixed to the vehicle from either or both sides. The anchoring member 85 is used preferably to abut a structural part of the vehicle, in order to prevent movement of the adapter 34.

As can be seen, a series of holes 88 are provided adjacent each of the members 84, 85 on vertical side 80. Cooperating with these are a series of ball lock release pins 87 (see FIG. 5) which are selectively placed to lock the members 84, 85, in position to ensure safe and secure attachment of adapter 34 to the vehicle. This is accomplished by pins 87 abutting the vertical section of the aforementioned shorter plate. Vehicle frame stops 86 are provided to ensure the adapter is properly positioned relative to the vehicle.

Vertical side 80 also contains the slots 90 (three shown) which cooperate with the double flange members 35. Guides 89 are also provided so that the container is properly positioned when elevated. Pulleys 39 are suitably located at the ends of the adapters 34 at the vertical side 80, thereof.

Under some conditions it is advantageous to have adapters 34 permanently secured direct to the structure of certain over-the-road trailer units.

In doing so, the adapters are modified by the elimination of attaching members 84 and 85, the slots in upper horizontal side 81, frame stops 86, the series of holes in vertical side 80, and the ball lock release pins, that are inserted into the series of holes in vertical side 80.

This would leave the adapter with slots 90, guides 89 and pulleys 39 on the vertical side to receive and secure the container in the same manner as previously outlined. The adapter is placed under the trailer structure with horizontal side 81 permanently affixed to the trailer by the use of rivets.

Typical constructional details are depicted in FIGS. 17 and 18. FIG. 17 discloses a door mounted between ribs 91, the locking means not shown. The container body walls 92 are shown to cover the outer side and part of the access side of the ribs 91. The door comprises a cover plate 93 having angle irons 94 and 95 fixed at the respective ends. Refrigerator gasketing 98 is wrapped around these edges. The door is mounted by a continuous offset hinge 99. Additional gaskets 96, 97 are fixed to walls 92 to ensure a good seal when the door is closed.

The door locking means, for example front door 15, shown in FIG. 18 and FIG. 1 comprises a rotatable rod 103 extending the length of the door and supported in end angle irons 105 by the bearings 104. An offset keeper member 106 fixed to each end of rod 103 then may rotate about a pin 107 fixed to end rib 21, to engage the pin 107 between keeper member 106 and angle iron 105. As shown in FIG. 2, the handle for rotating the rod 103 may comprise a lever handle 101 mounted in a recess 100. Thumb release 102 may also be provided to hold handle 101 in the closed position.

In operation, the auxiliary container is positioned underneath a vehicle having the adapters 34 thereon. Cables 37 and 38 are then payed out until they may be removed from hooks 79 and passed over their respective pulleys 39, 40. The crank 53 is then turned to draw the cables on the winch, thereby lifting the container. As the container reaches the adapters 34, the flange members 35 are positioned by the guides 89 so that the holes in the flange members 35 superimpose slot 90. Ball lock release pins 36 are then placed through the respective cooperating holes and slots. The winch mechanism is preferably locked in this position as an additional safety factor.

As an example, when used with conventional truck trailers, the auxiliary container may usefully hold 3000 pounds while still retaining a sizeable safety factor. For such a loading, 5/16" aircraft type cable (4700 pound minimum breaking strength) may be used, together with 2" x 2" and/or 2" x 3" square tubing for the ribs. Additional diagonal ribs (as shown in FIG. 1) are used for greater center support. Dimensionally, the container shown is 106" x 92" x 29".

It is of course obvious that the particular embodiment shown here is to be taken as the preferred embodiment, and that various changes in size, shape, arrangement and procedures, and use on many types of vehicles, may be resorted to without departing from the spirit of my invention, or the scope of the subjoined claims.

I claim:

1. An auxiliary container for use with transporting vehicles comprising adapting means attached to the underside of a vehicle and including pulley means; a container body, elevating means located within said body; and cable means fixed to said body and elevating means, the cable means being adapted for cooperation with said pulley means; and the adapting means comprising at least one adapter having an elongated horizontal surface defining at least two slots and an elongated vertical surface having the pulley means thereon, at least one vehicle attaching member slidably fixed to the horizontal surface in one of the slots, at least one anchoring member slidably fixed in the other of said slots, and means for locking the container body to the vertical surface.

2. In an auxiliary container to be carried under a vehicle and including a container body having a plurality of cables, each fixed at both ends to said body, and means varying the length of said cables, a vehicle adapter comprising at least one elongated adapter member having a horizontal surface defining at least one slot and a vertical surface; pulley means fixed to the vertical surface and adapted to engage an intermediate portion of the cables; at least one attaching member longitudinally adjustable along said slot and having clamping means for clamping the attaching member to the horizontal surface, and locking means on said vertical surface for locking the container to the vertical surface.

3. In an auxiliary container according to claim 2 wherein the locking means comprises a plurality of pins, each of which are insertable in a hole in said vertical surface and a cooperating hole in an upright flange on the container body.

4. A vehicle adapter according to claim 2 wherein the horizontal surface defines at least one other slot and further comprising an anchoring member longitudinally adjustable along the said other slot.

5. A removable auxiliary container for use with transporting vehicles comprising an adaptor and means for attaching the adaptor to the underside of the body of a vehicle; spaced rotatable pulleys fixed to the adaptor; a container body and wall means defining a compartment within the container body; elevating means including a winch drum located within the container body; cables attached at one end thereof to the winch drum, the other ends of the cables being fixed, respectively, to the container body at spaced points thereof, the cables including free portions intermediate the ends and means within the container body for providing access to the free portions of the cables from above the container body, each of the cables having their respective free portions receivable by one of the pulleys for cooperation therewith; and the elevating means including means to rotate the winch drum to draw the cables thereon and shorten the intermediate free portions to raise the container body.

6. A container according to claim 5 wherein the container body comprises a frame of interconnected rib members at least some of which are hollow and the free portions of the cables partly pass therethrough, the wall means being fixed to the rib members, and guide means within the hollow rib members cooperating with the cables to permit drawing of the cables on the winch drum.

7. A container according to claim 6 wherein the guide means within the hollow rib members comprise additional rotatable pulleys fixed to respective sides of the rib members.

8. A container according to claim 5 wherein the adaptor comprises an elongated portion to which the pulleys are attached and defining a vertical surface, and means for locking the container body to the vertical surface.

9. A container according to claim 8 wherein the vertical surface defines at least one slot, and the locking means comprises at least one flange member defining an opening and fixed to the upper side of the container body, the flange opening being aligned with the adaptor surface slot when the container is raised, and a release pin passing through the opening and the slot to hold the container body in a locked position.

10. A container according to claim 9 and further comprising at least one guide plate fixed to the vertical surface adjacent the slot, the guide plate defining a guide surface cooperating with the flange to guide the container body in a position enabling the adaptor slot and flange opening to be aligned.

11. In an auxiliary container carried under a transporting vehicle body, the combination comprising a container body of interconnecting rib members; wall means fixed to the rib members to define a compartment within the container body; an elevating mechanism located within the container body; four cables each fixed at one end thereof to the elevating mechanism, the other ends of the four cables being fixed to the container body at respective spaced points; means within the container body for enabling access to intermediate free portions of the cables from above the container body for attachment to a vehicle body; and guide means within the container body to operatively guide the cables thereon between the elevating mechanism and the access means, the elevating mechanism including means to vary the length of the intermediate portions of the cables to elevate and lower the container body.

12. The combination according to claim 11 wherein the container body is rectangular in shape with all six sides having wall means, the container body comprising four vertical and hollow corner ribs, horizontal rib members joining the corner ribs, support ribs attached to the horizontal rib members adjacent one vertical side of the container body for mounting the elevating mechanism adjacent the one said vertical side, and an access door within the wall means of the one vertical side for access to the elevating mechanism.

13. The combination according to claim 12 and further comprising four wheels on parallel axes having portions extending below the container body for rolling the body thereon, each of the wheels being rotatably mounted on horizontal rib members intermediate the corner ribs and adjacent respective vertical sides, the axes of two opposite wheels being lower than the axes of the other two opposite wheels to permit turning of the container body on the two lower mounted wheels.

14. The combination according to claim 13 wherein the cables pass internally of the hollow corner ribs, and the access means defines an opening at the top of the corner ribs, the cables being fixed at their other ends to the respective corner ribs.

15. The combination according to claim 14 wherein one horizontal rib member on each of two opposite vertical sides of the container body is hollow, each of the horizontal hollow rib members defining an opening intermediate the respective corner ribs for passage of two cables to the interior thereof from the elevating mechanism and each horizontal hollow rib member further defining openings at the junctions with the corner ribs for passage of the cables from the hollow horizontal rib members to the vertical ribs, and pulleys at the respective junctions to operatively guide the cables therethrough.

16. The combination according to claim 11 wherein at least some of the rib members are hollow and the cables pass therethrough at part of the intermediate portions thereof, the guide means including rotatable pulleys fixed within the hollow members.

17. The combination according to claim 11 wherein the elevating mechanism comprises a single rotatable winch drum to which the cables are attached, a spur gear fixed to said drum on the drum axis of rotation to control rotation of the drum, and crank means operatively engaging the spur gear to rotate the spur gear and drum.

18. The combination according to claim 16 wherein the container body is rectangular and has four vertical corner ribs which are hollow, and wherein each of the cables passes from said elevating mechanism upwardly through one of the corner ribs and out of the top of the frame, and is fixed to the said one corner rib.

19. A container body according to claim 18, wherein the elevating mechanism comprises a single rotatable winch drum to which the cables are attached, gear means for rotating said drum, and drive means for said gear means.

20. The combination according to claim 18 and further comprising means defining a door for access to the compartment.

References Cited in the file of this patent
UNITED STATES PATENTS

| | | |
|---|---|---|
| 218,581 | Schenck | Aug. 12, 1879 |
| 447,898 | Nygren | Mar. 10, 1891 |
| 1,112,840 | Royack | Oct. 6, 1914 |
| 2,536,567 | Peters | Jan. 2, 1951 |
| 2,634,000 | Ulrich | Apr. 7, 1953 |